(12) United States Patent
Cook et al.

(10) Patent No.: US 10,624,259 B2
(45) Date of Patent: Apr. 21, 2020

(54) SICKLE CUTTER FOR A HEADER OF A PLANT CUTTING MACHINE

(71) Applicant: CNH Industrial America LLC, New Holland, PA (US)

(72) Inventors: Joel Cook, Lititz, PA (US); Blaine Noll, Fleetwood, PA (US)

(73) Assignee: CNH Industrial America LLC, New Holland, PA (US)

(*) Notice: Subject to any disclaimer, the term of this patent is extended or adjusted under 35 U.S.C. 154(b) by 397 days.

(21) Appl. No.: 15/397,392

(22) Filed: Jan. 3, 2017

(65) Prior Publication Data

US 2018/0184587 A1 Jul. 5, 2018

(51) Int. Cl.
*A01D 34/13* (2006.01)
*A01D 34/14* (2006.01)
*A01D 34/30* (2006.01)

(52) U.S. Cl.
CPC ........... *A01D 34/14* (2013.01); *A01D 34/305* (2013.01)

(58) Field of Classification Search
USPC .......................................................... 56/299
See application file for complete search history.

(56) References Cited

U.S. PATENT DOCUMENTS

| | | | |
|---|---|---|---|
| 3,517,494 A | 6/1970 | Beusink et al. | |
| 4,805,390 A * | 2/1989 | Majkrzak | A01D 34/14 403/341 |
| 5,040,363 A * | 8/1991 | Limburg | A01D 34/14 56/300 |
| 6,962,040 B2 | 11/2005 | Talbot | |
| 8,151,547 B2 * | 4/2012 | Bich | A01D 34/30 56/158 |
| 8,893,462 B2 | 11/2014 | Talbot | |
| 9,357,697 B2 | 6/2016 | Surmann et al. | |
| 2014/0215995 A1 | 8/2014 | Cook et al. | |
| 2014/0245713 A1 * | 9/2014 | Cook | A01D 34/30 56/290 |
| 2014/0318094 A1 | 10/2014 | Cook et al. | |
| 2014/0345239 A1 | 11/2014 | Cook et al. | |
| 2015/0305233 A1 | 10/2015 | Surmann et al. | |
| 2016/0374265 A1 * | 12/2016 | Borry | A01D 34/135 56/296 |

* cited by examiner

*Primary Examiner* — Thomas B Will
*Assistant Examiner* — Mai T Nguyen
(74) *Attorney, Agent, or Firm* — Peter K. Zacharias; Patrick M. Sheldrake

(57) ABSTRACT

A header having a sickle cutter for a combine harvester is provided. The sickle cutter includes moveable first and second sickle knife assemblies oscillating at an offset phase. The sickle cutter further includes a stationary knife assembly positioned at a gap between the moveable first and second sickle knife assemblies.

19 Claims, 6 Drawing Sheets

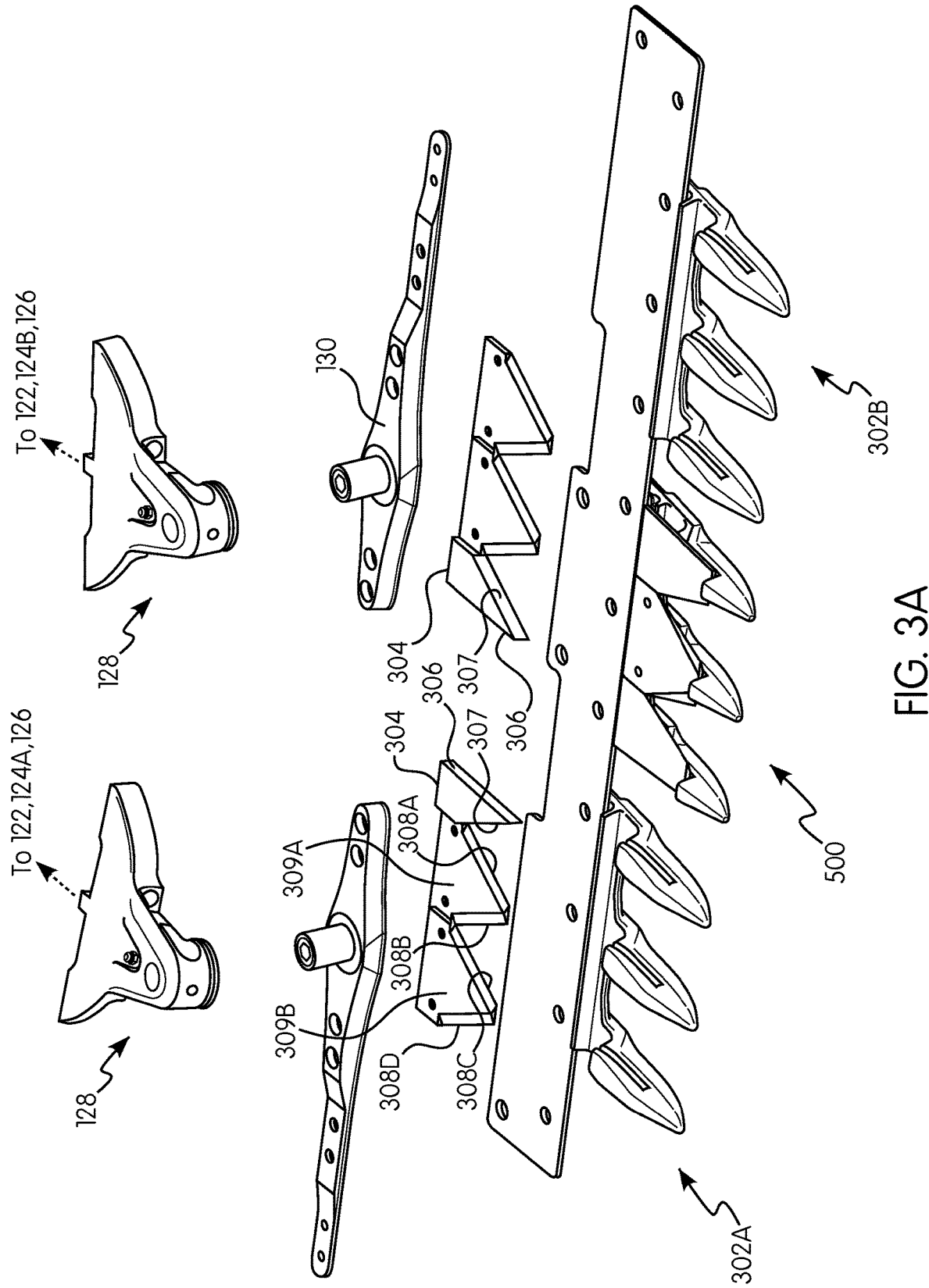

US 10,624,259 B2

SICKLE CUTTER FOR A HEADER OF A PLANT CUTTING MACHINE

FIELD OF THE INVENTION

The present invention relates generally to a sickle cutter of a header for use with an agricultural machine. In particular, the present invention relates to a stationary knife assembly for overlapping a gap between a pair of moveable knife assemblies.

BACKGROUND OF THE INVENTION

An agricultural machine such as a combine, windrower, cutting machine, mower, or the like is used to harvest a variety of crops from a field. During a harvesting operation, a header at the front of the machine cuts ripened crop from the field. If the header has multiple oscillating cutters, the areas between cutters may be cut too much (if strokes of the cutters overlap) or may be cut too little (if a gap exists between strokes of the cutters). Attempts to mitigate these issues include staggered cutter heights or staggered oscillating motions, both of which result in mechanical imbalances within the header and inconsistencies in crop cutting.

As such, there is still a need for a sickle cutter that has sufficient consistency and efficiency during harvesting operations. The present invention addresses the foregoing issues of conventional sickle cutters.

BRIEF SUMMARY OF THE INVENTION

In accordance with an exemplary embodiment of the present invention, there is provided a sickle cutter of a header for a plant cutting machine having a moveable first sickle knife assembly, a moveable second sickle knife assembly and a stationary knife assembly. The moveable first sickle knife assembly includes a first moveable ledger. The moveable second sickle knife assembly includes a second moveable ledger. The stationary knife assembly is located between and overlaps the moveable first and second sickle knife assemblies. The first and second sickle knife assemblies are reciprocatingly driven at an offset phase of about 180°.

In accordance with another exemplary embodiment of the present invention, there is provided a header for a plant cutting machine including a sickle drive, a moveable first sickle knife assembly, a moveable second sickle knife assembly and a stationary knife assembly. The sickle drive has a drive mechanism, first and second knife arms operatively connected to the drive mechanism, and first and second knife heads respectively mounted to the first and second knife arms. The sickle drive is configured to reciprocate the first and second knife arms in opposite directions. The moveable first sickle knife assembly is mounted to the first knife head. The moveable second sickle knife assembly is mounted to the second knife head. The first and second moveable sickle knife assemblies define a minimum gap therebetween when reciprocated to an innermost stroke position. The first and second moveable sickle knife assemblies define a maximum gap therebetween when reciprocated to an outermost stroke position. The stationary knife assembly is mounted between the moveable first and second sickle knife assemblies and includes a center guard and a stationary knife having a width greater than the maximum gap.

BRIEF DESCRIPTION OF THE SEVERAL VIEWS OF THE DRAWINGS

The foregoing summary, as well as the following detailed description of the exemplary embodiments of the invention, will be better understood when read in conjunction with the appended drawings. For the purpose of illustrating the invention, there are shown in the drawings exemplary embodiments. It should be understood, however, that the invention is not limited to the precise arrangements and instrumentalities shown.

In the drawings:

FIG. 3A is an exploded partial front perspective view of a sickle cutter of the header of FIG. 1 in accordance with an exemplary embodiment of the present invention;

DETAILED DESCRIPTION OF THE INVENTION

Figure 1:
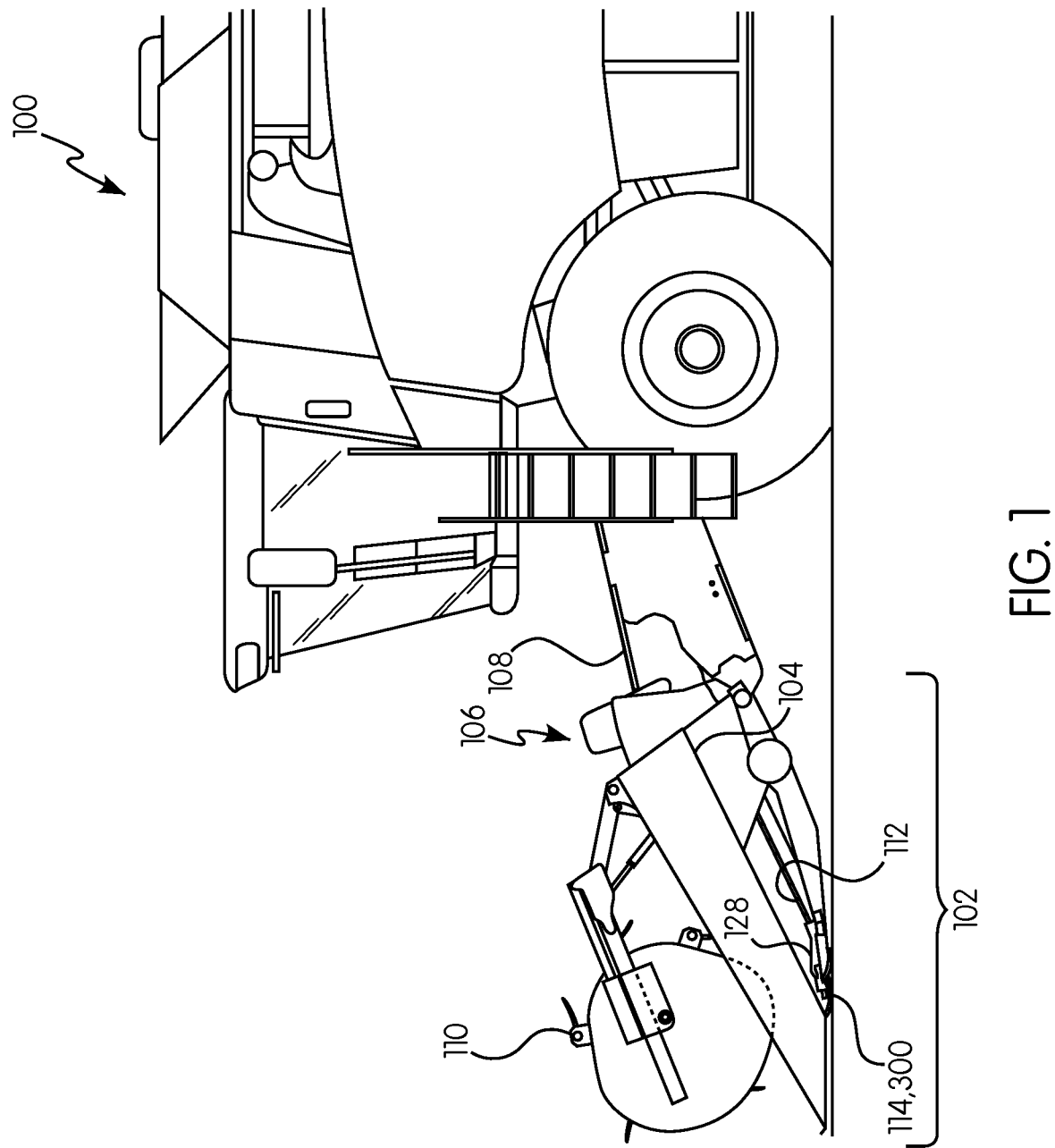
FIG. 1 is a left side elevation view of an agricultural harvester including a header in accordance with an exemplary embodiment of the present invention.

Reference will now be made in detail to the various aspects of the present invention illustrated in the accompanying drawings. Wherever possible, the same or like reference numbers will be used throughout the drawings to refer to the same or like features. It should be noted that the drawings are in simplified form and are not drawn to precise scale. In reference to the disclosure herein, for purposes of convenience and clarity only, directional terms such as top, bottom, left, right, above, below and diagonal, are used with respect to the accompanying drawings. Such directional terms used in conjunction with the following description of the drawings should not be construed to limit the scope of the present invention in any manner not explicitly set forth.

Certain terminology is used in the following description for convenience only and is not limiting. The words "right," "left," "lower" and "upper" designate directions in the drawings to which reference is made. The words "inwardly" and "outwardly" refer to directions toward and away from, respectively, the geometric center of the identified element and designated parts thereof. Additionally, the term "a," as used in the specification, means "at least one." The terminology includes the words above specifically mentioned, derivatives thereof, and words of similar import.

"About" as used herein when referring to a measurable value such as an amount, a temporal duration, and the like, is meant to encompass variations of ±20%, ±10%, ±5%, ±1%, or ±0.1% from the specified value, as such variations are appropriate.

The terms "grain," "ear," "stalk," "leaf," and "crop material" are used throughout the specification for convenience and it should be understood that these terms are not intended to be limiting. Thus, "grain" refers to that part of a crop which is harvested and separated from discardable portions of the crop material. The header of the present invention is applicable to a variety of crops, including but not limited to wheat, soybeans and small grains. The terms "debris," "material other than grain," and the like are used interchangeably.

Throughout this disclosure, various aspects of the present invention can be presented in a range format. It should be understood that the description in range format is merely for convenience and brevity and should not be construed as an inflexible limitation on the scope of the present invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 2.7, 3, 4, 5, 5.3, and 6. This applies regardless of the breadth of the range.

Furthermore, the described features, advantages and characteristics of the exemplary embodiments of the present invention may be combined in any suitable manner in one or more embodiments. One skilled in the relevant art will recognize, in light of the description herein, that the present invention can be practiced without one or more of the specific features or advantages of a particular exemplary embodiment. In other instances, additional features and advantages may be recognized in certain embodiments that may not be present in all exemplary embodiments of the present invention.

Figure 2:
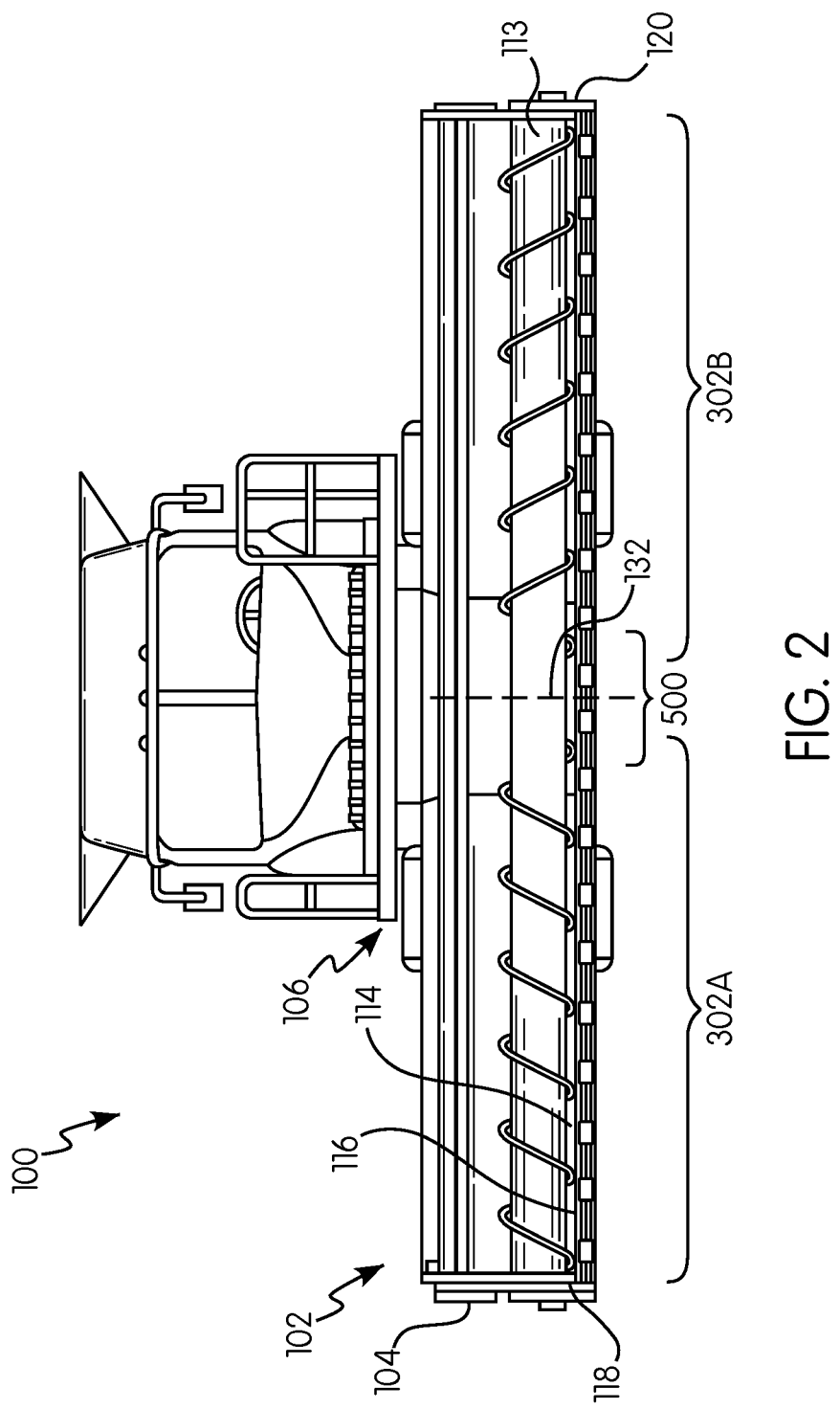
FIG. 2 is a front elevation view of the harvester including a header of FIG. 1.

Referring now to the drawings wherein an exemplary embodiment of the present invention is shown, FIGS. 1 and 2 illustrate a plant cutting machine 100 such as an agricultural combine. Plant cutting machine 100 includes a header 102 having a chassis or frame 104 which is attached to a forward end 106 of the harvester, more specifically to a feeder house 108. The header 102 is configured to cut crops as the plant cutting machine 100 moves forward over a crop field, and may include a reel 110 (FIG. 1), a draper belt 112 (FIG. 1) and/or an auger 113 (FIG. 2) for moving crop material sidewardly to the center along the header width and subsequently rearwardly, feeding the crop material to the plant cutting machine 100 through the feeder house 108.

Structurally, the header 102 includes a pan or floor 114 that is supported in a desired proximity to the surface of the field during the harvesting operation as shown in FIG. 2, and an elongate, sidewardly extending sickle cutter 300 along a forward edge portion 116 of the floor. The sickle cutter or cutterbar 300 is operable for severing the plants or crop for induction into the header 102.

Figure 3B:
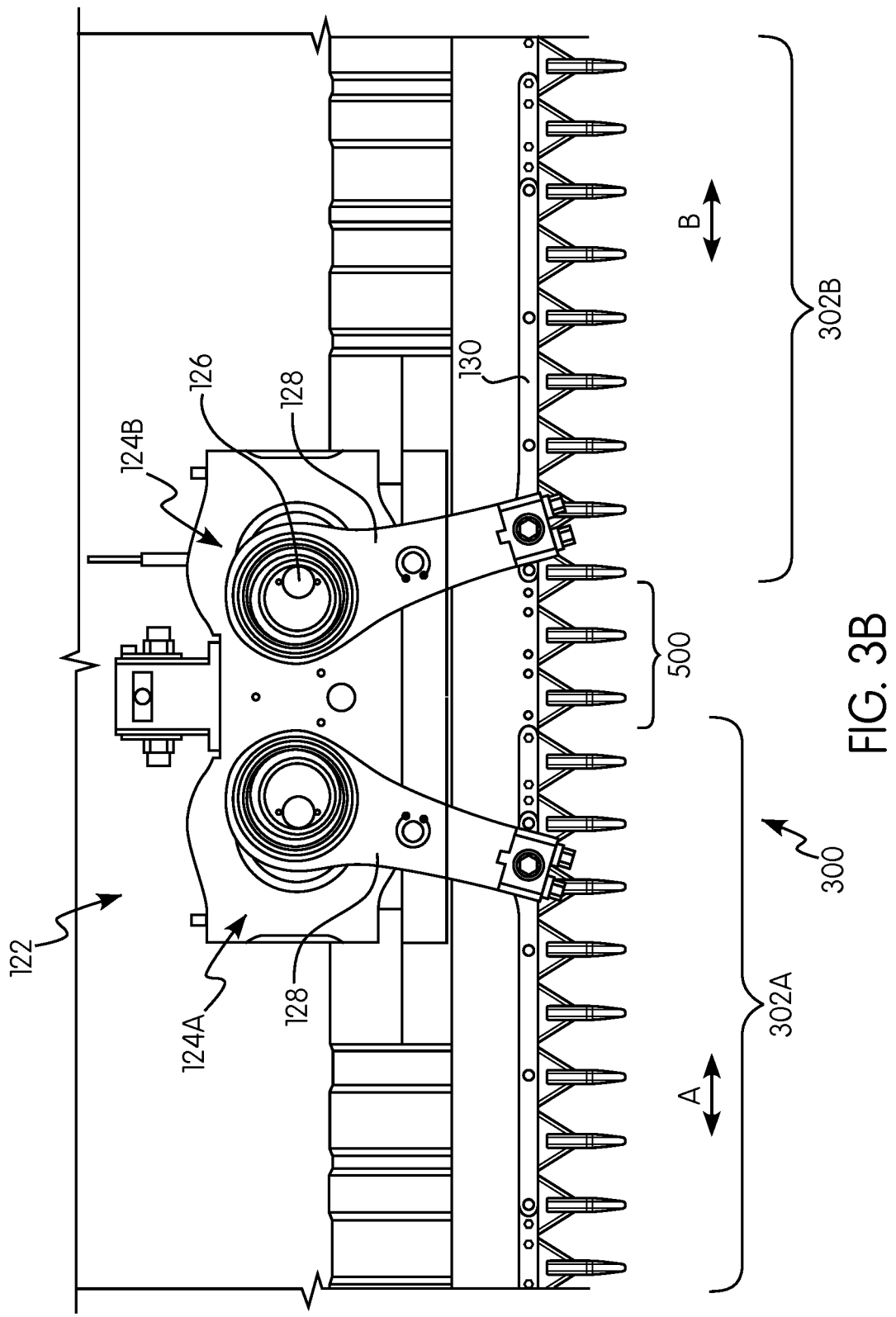
FIG. 3B is a partial top plan view of the header of FIG. 1 including a sickle drive.

Referring to FIGS. 2 and 3A, the sickle cutter 300 extends in a sideward direction along the width of the floor 114, between a first side edge portion 118 of the floor and an opposite second side edge portion 120. As shown in the exemplary embodiment of FIG. 3B, the sickle cutter 300 is powered by a sickle drive 122 that includes a first drive mechanism 124A, a second drive mechanism 124B, a pair of output shafts 126, a pair of knife arms 128 and a pair of knife heads 130. In an exemplary embodiment, the sickle drive 122 is incorporated into or below the floor 114 at a central location of the header 102 between the first and second side edge portions 118, 120.

The output shafts 126 are driven reciprocatingly by the first and second drive mechanisms 124A, 124B. The first and second drive mechanisms 124A, 124B reciprocate by being jointly driven in opposite rotational directions and in timed relation. In this manner, the output shafts 126 are reciprocatingly driven at an offset phase of about 180°.

The first and second drive mechanisms of the exemplary embodiment are connected to a power source via enmeshed gears, a cogged belt, a timing shaft or the like. The power source can be e.g., a motor, rotating shaft, belt drive, and the like. Additional details regarding sickle drives applicable to the present invention are disclosed in U.S. Patent Application Publication No. 2014/0345239 and U.S. Patent Application Publication No. 2014/0318094, the entire disclosures of which are hereby incorporated by reference herein in their entirety for all purposes. The power source can alternatively be two separate sickle drives that are timed or untimed. Moreover, in alternative embodiments, the two sickle drives may each be located on a lateral side of the header, centrally on the header, or slightly offset from a center of the header.

The knife arms 128 each attach proximally to the output shaft 126 and distally to the knife head 130. Distal ends of the knife arms 128 are indirectly connected to the sickle cutter 300. Due to the reciprocating rotation of the output shafts 126, the knife arms 128 are driven in opposite directions, that is, they reciprocate at an offset phase of about 180°. In other words, the knife arms 128 each move generally simultaneously outwardly toward the first and second side edge portions 118, 120 and inwardly toward each other. In an exemplary embodiment, the inward movement is toward a centerline 132 of the header 102.

Figure 4:
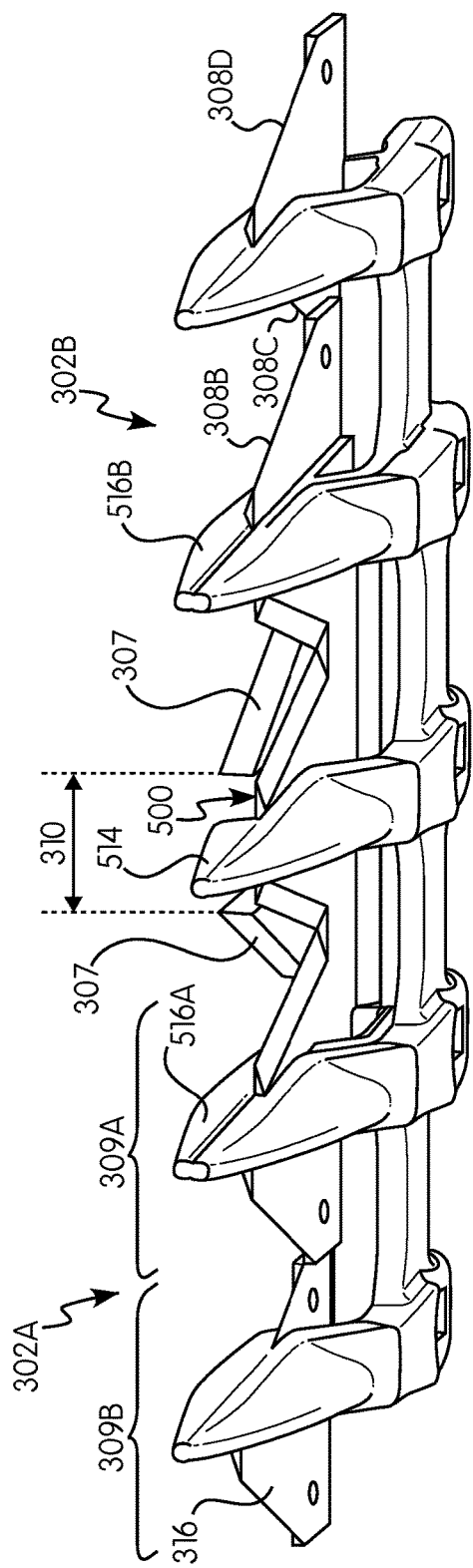
FIG. 4 is a partial bottom perspective view of a sickle cutter of the header of FIG. 3A.

Referring now to FIGS. 3A, 3B and 4, the sickle cutter 300 includes an elongate, sidewardly extending moveable first sickle knife assembly 302A and an elongate, sidewardly extending moveable second sickle knife assembly 302B extending in end to end relation to the moveable first sickle knife assembly. The moveable first and second sickle knife assemblies 302A, 302B are supported in substantially longitudinally aligned relation adjacent to the forward edge portion 116 of the floor 114. The moveable second sickle knife assembly 302B is structurally arranged substantially as a mirror image of the moveable first sickle knife assembly 302A, and as such is structurally configured and operates similar to the moveable first sickle knife assembly 302A.

The moveable first and second sickle knife assemblies 302A, 302B are each mounted to a respective knife head 130 at a distal end of a knife arm 128, such that the moveable first and second sickle knife assemblies reciprocate at an offset phase of about 180°. As shown in FIG. 3B, the moveable first sickle knife assembly 302A reciprocates in lateral directions of the header 102 as indicated at A and the moveable second sickle knife assembly 302B reciprocates in lateral directions as indicated at B.

Referring to FIG. 3A, the moveable first sickle knife assembly 302A includes a first moveable ledger 304 at an inboard end, that is, nearest the centerline 132 of the header 102 in the exemplary embodiment. The first moveable ledger 304 has a lateral planar face 306 facing inward toward the centerline 132 and facing the moveable second sickle knife assembly 302B. The first moveable ledger 304 further has an inner planar face 307 facing generally away from the centerline 132 and generally facing away from the moveable second sickle knife assembly 302B. Along an outward direction of the moveable first sickle knife assembly 302A is a series of knives 308A, 308B, 308C, 308D However, more or fewer knives may be provided. Pairs of knives such as 308A-B and 308C-D each constitute a knife section 309A and 309B, respectively.

In the exemplary embodiment, the first moveable ledger 304 is a generally triangular section of the moveable first sickle knife assembly 302A with the inner planar face 307 forming the hypotenuse of a right triangle. The first moveable ledger 304 includes a major plane having a surface area about half of a surface area of a major plane of the knife section 309A, 309B. The first moveable ledger 304 may have a greater height or vertical thickness than the knife sections 309A, 309B. Other shapes are contemplated for the first moveable ledger 304, the lateral planar face 306, and the inner planar face 307. For example, the first moveable ledger 304 may be square or rectangular. The lateral planar face 306 and inner planar face 307 may be curved concavely or convexly and may be disposed at any angle relative to a longitudinal axis of the plant cutting machine 100 and header 102.

As best shown in FIG. 4, the moveable first sickle knife assembly 302A has a substantially flat bottom side or underside 316 with the knives 308A-D being angled relative to the bottom side so as to taper downwardly and distally toward the bottom side, such that cutting edges are formed at the flat bottom side. The bottom side 316 also has a countersink for receiving a fastener for securing the respective moveable sickle knife assembly to a knife head 130.

The lateral planar faces 306 of each of the moveable first and second sickle knife assemblies 302A, 302B are generally or substantially parallel to each other and to the centerline 132, in other words, the lateral planar faces 306 each extend generally or substantially parallel to a longitudinal axis defined by the plant cutting machine 100.

Both the lateral planar face 306 and the inner planar face 307 of each of the moveable first and second sickle knife assemblies 302A, 302B are arranged substantially vertically. As such, in the exemplary embodiment, the lateral planar face 306 and the inner planar face 307 form square edges relative to the bottom side 316.

The moveable ledgers 304 of the moveable first and second sickle knife assemblies 302A, 302B define a variable gap 310 therebetween. During reciprocating motion of the moveable first and second sickle knife assemblies 302A, 302B, the width of the variable gap 310 oscillates between a minimum gap 312 (FIG. 6A) and a maximum gap 314 (FIG. 6C) as will be discussed further below.

The first moveable ledger 304 and the knife sections 309A, 309B are shown in FIG. 3A as being integrally formed. However, they may be constructed as separate components that are fastened together, or the first moveable ledger 304 may be a separate component that is fastened to integrally formed knife sections 309A, 309B. Regardless of construction, in the exemplary embodiment shown in FIG. 4 the first moveable ledger 304 and the knife sections 309A, 309B form the substantially flat, planar bottom surface 316.

Figure 5:
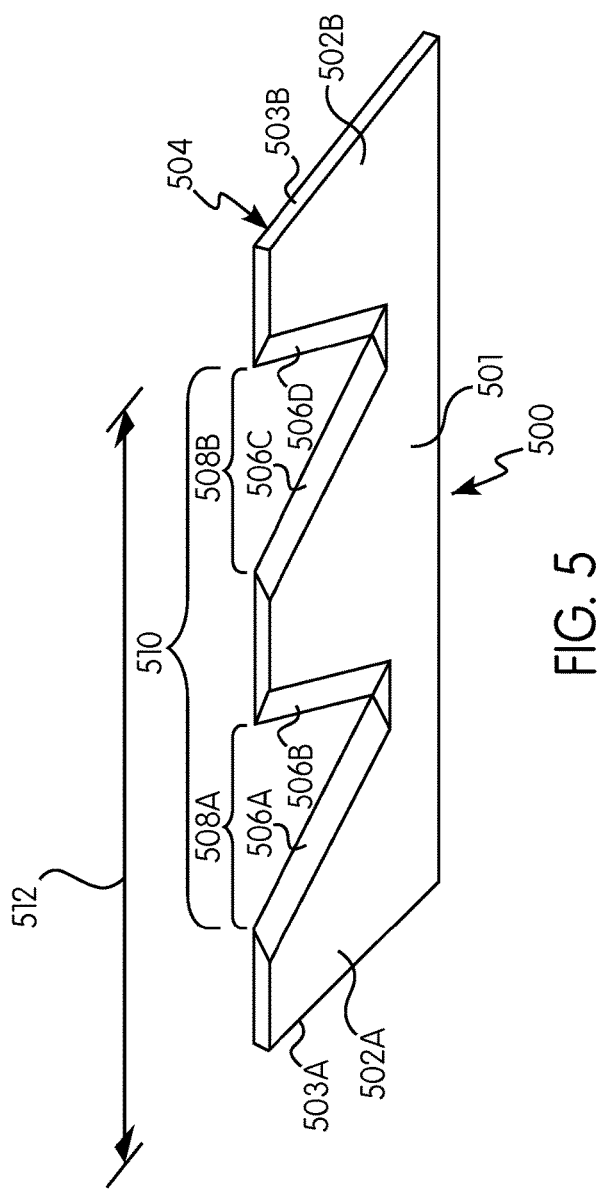
FIG. 5 is a bottom perspective view of a stationary knife of the sickle cutter of FIG. 3A.

Referring to FIG. 5, the sickle cutter 300 includes a stationary knife assembly 500 having first and second lateral ledgers 502A, 502B.

The first and second lateral ledgers 502A, 502B each have a lateral planar face 503A, 503B respectively. The lateral planar faces 503A, 503B face outwardly toward the first and second side edge portions 118, 120 of the header 102. In other words, the lateral planar faces 503A, 503B face away from the centerline 132 in the exemplary embodiment. The lateral planar faces 503A, 503B of the stationary knife assembly 500 are generally or substantially parallel to each other, and likewise are generally or substantially parallel to the centerline 132 of the header 102 and the lateral planar faces 306 of each of the moveable first and second sickle knife assemblies 302A, 302B.

As shown in FIGS. 4 and 5, the stationary knife assembly 500 includes a stationary knife 501 having a substantially flat top side 504 with the stationary knives 506A-D being angled relative to the top side so as to taper upwardly and distally toward the top side, such that cutting edges are formed at the flat top side. Pairs of the stationary knives 506A-B and 506C-D may generally be considered to be inner cutting surfaces 508A and 508B, respectively. Inner cutting surfaces 508A and 508B are generally V-shaped. Alternatively, knives 506A-D may be considered to collectively constitute a cutting area 510 extending between the first and second lateral ledgers 502A, 502B.

The stationary knife 501 defines a lateral width 512 between the lateral planar faces 503A, 503B. As shown in FIG. 4, the stationary knife assembly 500 also includes a center guard 514 and first and second lateral guards 516A, 516B. The center guard 514 defines a center guard width 518 at a rearward base of the center guard, i.e., at a proximal end of the center guard nearest the sickle drive 122.

In the exemplary embodiment, the stationary knife assembly 500 is fixedly mounted to the header 102 so as to extend across the centerline 132, which is where the variable gap 310 is formed and is between the first and second knife drive mechanisms 124A, 124B. However, the first and second knife drive mechanisms 124A, 124B may be mounted at other locations across the header and knife heads 130 of different sizes may be used, such that the variable gap 310 is not located about the centerline 132. In such embodiments the stationary knife assembly 500 is located so as to overlap with the variable gap 310 and thus overlap with operational stroke movements of both the moveable first and second sickle knife assemblies 302A, 302B.

Figure 6A:
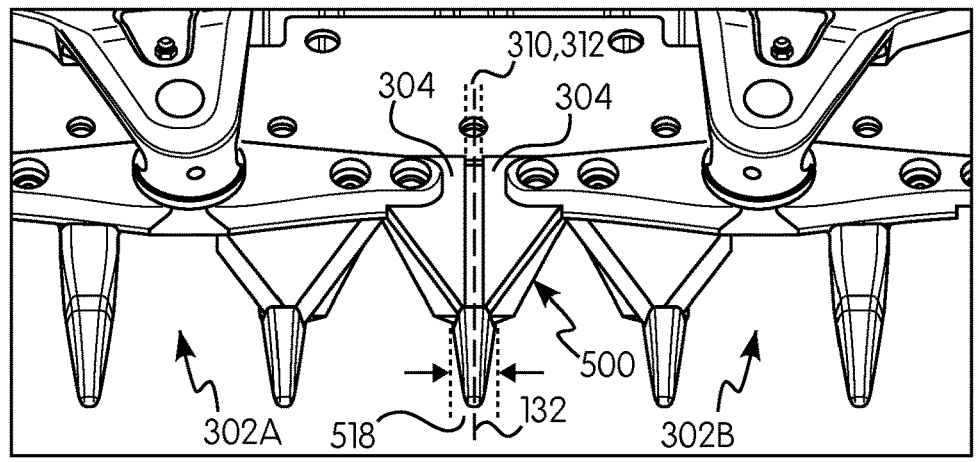
FIG. 6A is a partial top plan view of the sickle cutter of FIG. 3A in a most inward stroke position.
Figure 6B:
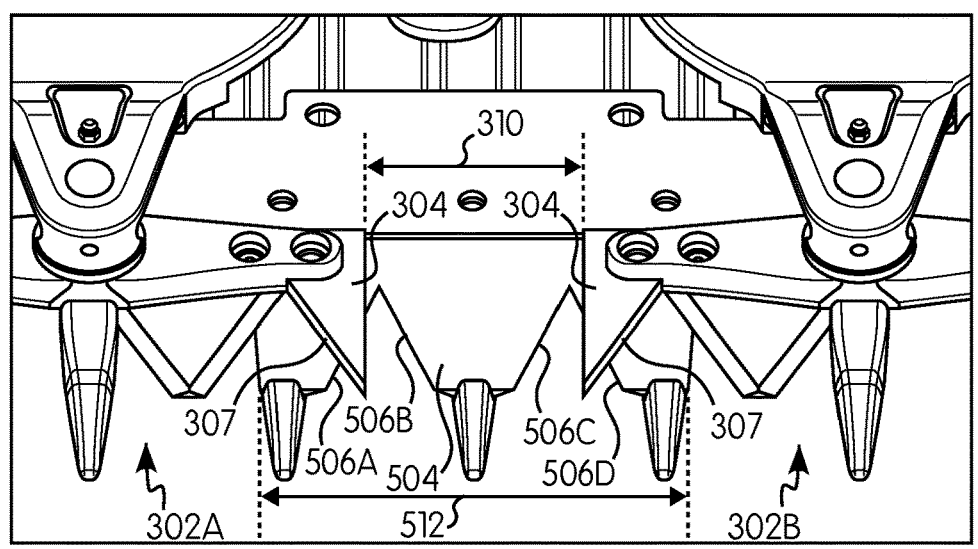
FIG. 6B is a partial top plan view of a sickle cutter of the header of FIG. 3A in an intermediate stroke position.
Figure 6C:
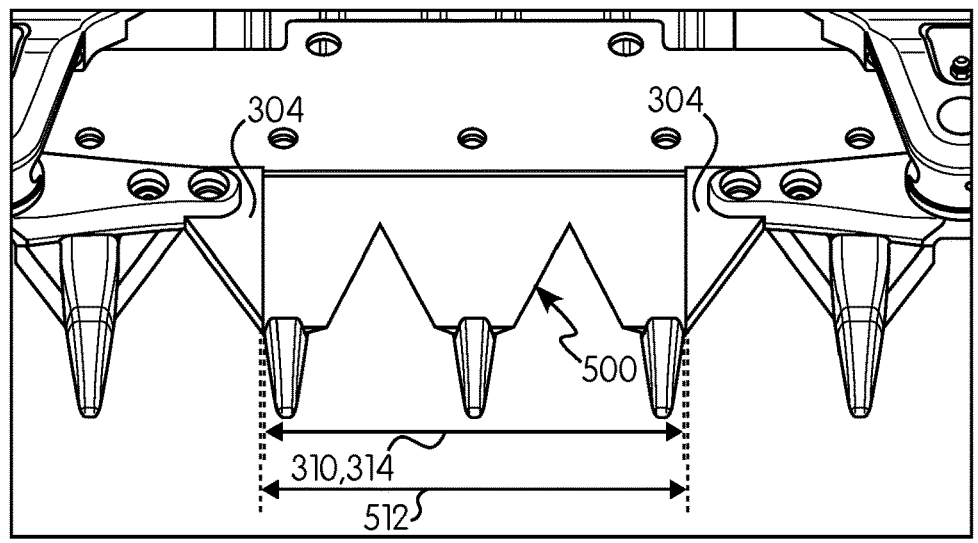
FIG. 6C is a partial top plan view of a sickle cutter of the header of FIG. 3A in a most outward stroke position.

Operational stroke movement of the moveable first and second sickle knife assemblies 302A, 302B is illustrated in FIGS. 6A-C. FIG. 6A illustrates a most inward stroke position of the moveable first and second sickle knife assemblies 302A, 302B. In this position, the minimum gap 312 is less than the width 518 of the center guard 514, but the moveable ledgers 304 do not come in contact.

FIG. 6B illustrates an intermediate stroke position of the moveable first and second sickle knife assemblies 302A, 302B. In the intermediate position during use, the first and second moveable ledgers 304 interact with the stationary knife 501 to cause crop cutting by the stationary knives 506A-D and the lateral ledgers 502A, 502B interact with the moveable first and second sickle knife assemblies 302A, 302B to cause crop cutting by the knives 308A-D, as further discussed below.

FIG. 6C illustrates a most outward stroke position of the moveable first and second sickle knife assemblies 302A, 302B. In this position, the lateral planar faces 306 of the moveable ledgers 304 do not extend laterally beyond the first and second lateral ledgers 502A, 502B.

When assembled, the stationary knife assembly 500 ensures sufficient and consistent crop cutting about the centerline 132 of the header 102. That is, the stationary knife assembly 500 ensures sufficient and consistent crop cutting at the variable gap 310 between the moveable ledgers 304 of the moveable first and second sickle knife assemblies 302A, 302B. Moreover, the stationary knife assembly 500 prevents superfluous wasted motion of the sickle cutter 300 because the moveable first and second sickle knife assemblies 302A, 302B can provide sufficient crop cutting without passing completely across the centerline 132 of the header. In alternative embodiments not positioned about the centerline 132, the stationary knife assembly 500 prevents any overlap in the most inward stroke positions of the moveable first and second sickle knife assemblies 302A, 302B.

The stationary knife assembly 500 also allows for the substantially opposite reciprocating motions of the moveable first and second sickle knife assemblies 302A, 302B because there is no risk of the moveable ledgers 304 colliding when at a most inward stroke position as in FIG. 6A. This is accomplished by the center guard 514 extending across the minimum gap 312 position of the variable gap 310, so as to prevent loss of crop within the minimum gap 312.

In operation, the moveable first and second sickle knife assemblies 302A, 302B are arranged to maximize efficiency and balance of the sickle cutter 300. The reciprocating motion at an offset phase of about 180° minimizes vibrations and stresses within the sickle cutter 300 and the header 102. The bottom sides 316 of the moveable first and second sickle knife assemblies 302A, 302B are placed at substantially the same height as each other so as to provide consistent cutting and to provide clean cutting when passing over the stationary knife assembly 500.

As shown in FIGS. 4 and 5, when the moveable first and second sickle knife assemblies 302A, 302B oscillate during use, the flat bottom sides 316 pass along the flat top side 504 of the stationary knife assembly such that the respective cutting edges are closely adjacent. This arrangement provides efficient and clean cutting of crop stalks with minimal bending or tearing. To ensure this closely adjacent position, the countersink in the flat bottom side 316 is provided for fasteners connecting the moveable sickle knife assembly 302A, 302B to a respective knife head 130.

Generally, the moveable ledgers 304 of the moveable first and second sickle knife assemblies 302A, 302B have generally flat planar faces that are not intended for cutting crops. Because the moveable ledgers 304 never extend outwardly beyond the first and second lateral ledgers 502A, 502B of the stationary knife 501, crop stalks cannot pass between the ledgers or, more generally, between the stationary knife 500 and either of the moveable first and second sickle knife assemblies 302A, 302B. This advantageously ensures that crop cutting occurs at the knives 308A-D and/or the stationary knives 506A-D.

During reciprocating motion of the moveable first and second sickle knife assemblies 302A, 302B, the lateral planar face 306 and the inner planar face 307 form blunt edges that tend to push crop material as opposed to cutting it. In particular, as shown in FIGS. 3A and 6B, during inward stroke movement, the lateral planar face 306 of the moveable first sickle knife assembly 302A pushes a crop against stationary knives 506B and 506D. During outward stroke movement, the inner planar face 307 of the moveable first sickle knife assembly 302A pushes a crop against stationary knives 506A and 506C. The height of the first and second moveable ledgers 304 provides a relatively large surface to push a crop consistently and promote a clean cut of the crop by the stationary knives 506A-D.

The lateral planar faces 503A, 503B of the stationary knife assembly 500 aid in cutting by the knife sections 309A, 309B. In particular, as shown in FIGS. 3A and 5, during inward stroke movement, the lateral planar faces 503A, 503B hold a crop against knives 308A and 308C of the moveable first and second sickle knife assemblies 302A, 302B.

While the present invention has been described with reference to exemplary embodiments, it will be appreciated by those skilled in the art that various changes may be made and equivalents may be substituted for elements thereof without departing from the scope of the present invention. In addition, modifications may be made to adapt a particular situation or material to the teachings of the present invention without departing from the essential scope thereof. For example, the stationary knife assembly 500 may be widened and provided with additional knives 506 and additional inner cutting surfaces 508. Likewise, a header may support one or more sickle drives 122 (e.g., one, two, three, four or five sickle drives 122) each having a first and second drive mechanism 124A, 124B, moveable first and second sickle knife assemblies 302A, 302B and a stationary knife assembly 500 mounted at a respective variable gap 310. Moreover, as noted above, although the exemplary embodiment shows the stationary knife assembly 500 and moveable first and second sickle knife assemblies 302A, 302B as being centered about the centerline 132 of the header, other embodiments may be slightly offset from the centerline 132 (e.g., offset by about the width of one, two, or three knife sections 309) or located at any position across the lateral width of the header. It is to be understood, therefore, that the present invention not be limited to the particular aspects disclosed, but it is intended to cover modifications within the spirit and scope of the present invention as defined by the appended claims.

We claim:

1. A sickle cutter of a header for a plant cutting machine, comprising:
a moveable first sickle knife assembly including a first moveable ledger having a lateral planar face;
a moveable second sickle knife assembly including a second moveable ledger having a lateral planar face facing the lateral planar face of the first moveable ledger; and
a stationary knife assembly between and overlapping the moveable first and second sickle knife assemblies, wherein the moveable first and second sickle knife assemblies are reciprocatively driven at an offset phase of about 180°, and wherein the first and second moveable ledgers define a minimum gap therebetween when the moveable first and second sickle knife assemblies are in an inward stroke position.

2. The sickle cutter of claim 1, wherein the stationary knife assembly includes a center guard having a width greater than a width of the minimum gap.

3. The sickle cutter of claim 1, wherein the stationary knife assembly includes an inner cutting surface that overlaps the at least one of the first and second moveable ledgers.

4. The sickle cutter of claim 1, wherein the moveable first sickle knife assembly further includes a knife section adjacent the first moveable ledger.

5. The sickle cutter of claim 4, wherein the first moveable ledger is generally triangular shaped and includes a major plane having a surface area of about half of a surface area of a major plane of the knife section.

6. The sickle cutter of claim 1, wherein the first and second moveable ledgers define a maximum gap when in an outward stroke position, and wherein the maximum gap is less than an overall width of the stationary knife assembly.

7. The sickle cutter of claim 1, wherein each of the moveable first and second knife assemblies includes a countersink on an underside thereof to receive a fastener for securing the respective sickle knife assembly to a knife head.

8. A header for a plant cutting machine comprising:
a sickle drive including:
a drive mechanism,
first and second knife arms operatively connected to the drive mechanism, and
first and second knife heads respectively mounted to the first and second knife arms, wherein the sickle drive is configured to reciprocate the first and second knife arms in opposite directions;

a moveable first sickle knife assembly mounted to the first knife head;

a moveable second sickle knife assembly mounted to the second knife head, wherein the first and second moveable sickle knife assemblies define a minimum gap therebetween when reciprocated to an innermost stroke position, and wherein the moveable first and second sickle knife assemblies define a maximum gap when reciprocated to an outermost stroke position; and a stationary knife assembly mounted between the moveable first and second sickle knife assemblies, the stationary knife assembly including a stationary knife having first and second lateral ledgers and an inner cutting surface.

9. The header of claim 8, wherein the drive mechanism includes first and second output shafts, wherein the first and second knife arms are respectively mounted at their proximal ends to the first and second output shafts.

10. The header of claim 8, wherein the inner cutting surface is V-shaped.

11. The header of claim 8, wherein the moveable first sickle knife assembly includes a first moveable ledger, the moveable second sickle knife assembly includes a second moveable ledger, and wherein each of the first and second moveable ledgers and the first and second lateral ledgers has a planar laterally facing end.

12. The header of claim 11, wherein the first and second moveable ledgers each have a flat face defining the minimum gap.

13. A sickle cutter of a header for a plant cutting machine, comprising:

a moveable first sickle knife assembly including a first moveable ledger;

a moveable second sickle knife assembly including a second moveable ledger; and a stationary knife assembly between and overlapping the moveable first and second sickle knife assemblies, wherein the stationary knife assembly includes first and second lateral ledgers and an inner cutting surface extending between the first and second lateral ledgers.

14. The sickle cutter of claim 13, wherein the moveable first sickle knife assembly and moveable second sickle knife assembly are aligned along a single plane.

15. The sickle cutter of claim 13, wherein the stationary knife assembly includes an inner cutting surface that overlaps the first moveable ledger.

16. The sickle cutter of claim 13, wherein the moveable first sickle knife assembly further includes a knife head and a plurality of knives attached to the knife head.

17. A header for a plant cutting machine comprising:

a sickle drive including:
 a drive mechanism,
 first and second knife arms operatively connected to the drive mechanism, and
 first and second knife heads respectively mounted to the first and second knife arms, wherein the sickle drive is configured to reciprocate the first and second knife arms in opposite directions at an offset phase of about 180°;

a moveable first sickle knife assembly mounted to the first knife head, the moveable first sickle knife assembly including a first moveable ledger having a lateral planar face;

a moveable second sickle knife assembly mounted to the second knife head, the moveable second sickle knife assembly including a second moveable ledger having a lateral planar face facing the lateral planar face of the first moveable ledger, wherein the first and second moveable sickle knife assemblies define a minimum gap therebetween when reciprocated to an innermost stroke position, and wherein the moveable first and second sickle knife assemblies define a maximum gap when reciprocated to an outermost stroke position; and a stationary knife assembly mounted between the moveable first and second sickle knife assemblies.

18. The header of claim 17, wherein the moveable first sickle knife assembly and moveable second sickle knife assembly are positioned along a single plane.

19. The header of claim 17, wherein the stationary knife assembly includes an inner cutting surface that overlaps the first moveable ledger.

\* \* \* \* \*